United States Patent
Koizumi et al.

(10) Patent No.: US 9,025,970 B2
(45) Date of Patent: May 5, 2015

(54) OPTICAL SIGNAL CUTOFF DETECTION CIRCUIT AND OPTICAL RECEIVER

(75) Inventors: Hiroshi Koizumi, Kanagawa (JP); Kazuyoshi Nishimura, Kanagawa (JP); Masafumi Nogawa, Kanagawa (JP); Yoshikazu Urabe, Kanagawa (JP)

(73) Assignees: Nippon Telegraph and Telephone Corporation, Tokyo (JP); NTT Electronics Corporation, Kanagawa (JP)

( * ) Notice: Subject to any disclaimer, the term of this patent is extended or adjusted under 35 U.S.C. 154(b) by 301 days.

(21) Appl. No.: 13/578,811

(22) PCT Filed: Feb. 14, 2011

(86) PCT No.: PCT/JP2011/053013
§ 371 (c)(1),
(2), (4) Date: Oct. 26, 2012

(87) PCT Pub. No.: WO2011/099598
PCT Pub. Date: Aug. 18, 2011

(65) Prior Publication Data
US 2013/0039649 A1    Feb. 14, 2013

(30) Foreign Application Priority Data
Feb. 15, 2010    (JP) .................................. 2010-030011

(51) Int. Cl.
*H04B 10/06*    (2006.01)
*H04B 10/69*    (2013.01)

(52) U.S. Cl.
CPC .............. *H04B 10/69* (2013.01); *H04B 10/697* (2013.01)

(58) Field of Classification Search
None
See application file for complete search history.

(56) References Cited

U.S. PATENT DOCUMENTS

| | | | | |
|---|---|---|---|---|
| 4,688,260 | A | * | 8/1987 | Shutterly et al. ................. 398/62 |
| 5,875,049 | A | * | 2/1999 | Asano et al. ................... 398/202 |
| 5,892,609 | A | * | 4/1999 | Saruwatari .................... 398/202 |
| 6,480,311 | B1 | | 11/2002 | Okuda et al. |
| 7,307,569 | B2 | * | 12/2007 | Vrazel et al. ................... 341/144 |
| 7,868,701 | B2 | * | 1/2011 | Nakamura et al. ............. 330/308 |
| 2002/0167693 | A1 | * | 11/2002 | Vrazel et al. ................... 359/109 |
| 2003/0095315 | A1 | * | 5/2003 | Hoshide ......................... 359/189 |
| 2005/0105913 | A1 | * | 5/2005 | Ozeki et al. .................... 398/140 |
| 2006/0216042 | A1 | * | 9/2006 | Yeo et al. ....................... 398/209 |
| 2007/0226771 | A1 | | 9/2007 | Nagahori |
| 2009/0297168 | A1 | * | 12/2009 | Miyata et al. .................. 398/198 |
| 2012/0251128 | A1 | * | 10/2012 | Ishii ............................... 398/186 |
| 2014/0016949 | A1 | * | 1/2014 | Koizumi et al. ............... 398/212 |

FOREIGN PATENT DOCUMENTS

| | | |
|---|---|---|
| CN | 1212529 | 3/1999 |
| CN | 1954498 | 4/2007 |
| JP | H01-245725 A | 9/1989 |

(Continued)

*Primary Examiner* — Li Liu
(74) *Attorney, Agent, or Firm* — Blakely Sokoloff Taylor & Zafman

(57) ABSTRACT

A comparator (11) outputs, out of an electrical signal input from a trans impedance amplifier (TIA) via a coupling capacitor, pulses having amplitudes equal to or larger than a reference value as a comparison output signal (Cout). An analog holding circuit (12) charges a holding capacitor with each pulse contained in the comparison output signal (Cout) and also removes a DC voltage obtained by the charging via a discharging resistor, thereby generating a holding output signal (Hout) that changes in accordance with the presence/absence of input of an optical signal. This allows to perform an autonomous operation without any necessity of an external control signal and properly detect the presence/absence of input of an optical signal.

10 Claims, 11 Drawing Sheets

(56) References Cited

FOREIGN PATENT DOCUMENTS

| | | |
|---|---|---|
| JP | 2007-005968 A | 1/2007 |
| JP | 2007-081599 A | 3/2007 |
| JP | 2007-189294 A | 7/2007 |
| JP | 2009-044228 A | 2/2009 |
| WO | WO 2005/114843 | 12/2005 |

\* cited by examiner

OPTICAL SIGNAL CUTOFF DETECTION CIRCUIT AND OPTICAL RECEIVER

This is a non-provisional application claiming the benefit of International Application Number PCT/JP2011/053013 filed Feb. 14, 2011.

TECHNICAL FIELD

The present invention relates to an optical communication technique and, more particularly, to an optical signal detection technique capable of properly detecting the presence/absence of input of an optical signal.

BACKGROUND ART

In PON (Passive Optical Network) employed by an FTTH (Fiber To The Home) system as a high-speed broad-band optical transmission method, an OLT (Optical Line Terminal) that accommodates a plurality of users on the station side and an ONU (Optical Network Unit) that terminates an optical subscriber line on the user side are connected via an optical fiber so as to bidirectionally transmit signals.

In case of connection of a new ONU, if the optical reception circuit of the OLT has no noise masking function of preventing unnecessary noise output in the absence of optical input, the access controller connected to the subsequent stage of the analog front end needs to determine, by a specific algorithm, whether a received optical signal is noise or an optical signal from the newly connected ONU. Hence, the cost increases, and communication control becomes inefficient as the upper layer grows complicated.

On the other hand, there is provided, for the optical reception circuit of the OLT, a technique of causing an optical signal cutoff detection circuit to determine, based on an electrical signal output from a trans-impedance amplifier (TIA), the presence/absence of input of an optical signal and preventing unnecessary noise output from the optical receiver in the absence of an optical signal (for example, see patent literature 1).

As shown in FIG. 10, in an optical receiver 200, an optical signal Pin received by a photodiode PD is photoelectrically converted into a photocurrent signal Iin and amplified by a trans impedance amplifier TIA serving as a preamplifier. An electrical signal Tout from the trans impedance amplifier TIA is input to a limiting amplifier LA serving as a post-amplifier, amplified so as to change the optical signal Pin having a different strength to an electrical signal having a predetermined amplitude, and output as a reception output Rout. A waveform shaping circuit such as a CDR (Clock Data Recovery) or a timing adjustment circuit is normally connected to the subsequent stage of the limiting amplifier LA so as to extract a clock signal from the data signal and perform waveform shaping to obtain a digital signal easy to handle.

On the other hand, an optical signal cutoff detection circuit (LOS: Loss Of Signal) 20 for determining reception of the optical signal Pin is provided at the subsequent stage of the trans impedance amplifier TIA in parallel to the limiting amplifier LA. The optical signal cutoff detection circuit 20 generates a signal cutoff detection signal LOS representing whether the optical signal Pin having a sufficient signal strength is received, thereby detecting a communication error or performing squelch circuit control to cut off noise output from the limiting amplifier LA under no-signal conditions.

In the optical signal cutoff detection circuit 20, only when the optical signal Pin is received, a comparator 21 outputs a comparison output signal Cout. An SR latch 22 holds the comparison output signal Cout and converts it into the signal cutoff detection signal LOS formed from a DC signal. Holding of the signal cutoff detection signal LOS in the SR latch 22 is canceled by a reset signal RESET. For example, in burst communication represented by the PON system, a PON control IC can output the reset signal RESET at the end of burst packet reception.

Hence, using the signal cutoff detection signal LOS as the output control signal of the limiting amplifier LA to, for example, control squelch and closing the squelch from reception of the reset signal up to reception of the next burst signal make it possible to prevent noise output from the limiting amplifier LA. When the burst signal is received, the squelch can be opened to return to a normal reception state.

The comparator 21 shown in FIG. 11 includes a bias circuit 21A, a first-stage amplification circuit 21B, a first-stage emitter-follower circuit 21C, and a second-stage amplification circuit 21D.

A noninverted signal Tout+ and inverted signal Tout− of the electrical signal Tout input from the trans impedance amplifier TIA are AC-coupled to the bias circuit 21A via coupling capacitors C. Since the coupling capacitor C is a differentiating circuit, the differential waveforms of the noninverted signal Tout+ and inverted signal Tout− are input to a pair of differential transistors Q1 and Q2 of the first-stage amplification circuit 21B, respectively.

When load resistors R5 and R6 of the pair of differential transistors Q1 and Q2 have values different from each other, each output of the first-stage amplification circuit 21B has an offset voltage at the DC level.

Hence, unless the noninverted signal Tout+ and inverted signal Tout− having sufficient amplitudes are input, the output amplitude of the first-stage amplification circuit 21B is insufficient, and no differential signals can be formed, that is, the noninverted output from the transistor Q1 and the inverted output from the transistor Q2 do not cross. For this reason, the second-stage amplification circuit 21D connected via the first-stage emitter-follower circuit 21C does not output the comparison output signal Cout, and the signal remains at Low level.

On the other hand, if the noninverted signal Tout+ and inverted signal Tout− having sufficient amplitudes are input, the noninverted output from the transistor Q1 and the inverted output from the transistor Q2 cross. Hence, High level and Low level corresponding to the intersections alternatively appear as the comparison output signal Cout.

Since the SR latch 22 holds the comparison output signal Cout, the High level signal is continuously output as the comparison output signal Cout upon, for example, receiving the optical signal Pin. As the feature of this circuit, therefore, once the High level signal is output as the comparison output signal Cout, that level is held. It is therefore possible to implement the high-speed optical signal cutoff detection circuit 20 that immediately responds to signal reception.

RELATED ART LITERATURE

Patent Literature

Patent Literature 1: Japanese Patent Laid-Open No. 2009-044228

DISCLOSURE OF INVENTION

Problem to be Solved by the Invention

In the above-described related art, however, it is impossible to perform an autonomous operation without any necessity of an external control signal and properly detect the presence/absence of input of an optical signal.

That is, the above-described optical signal cutoff detection circuit 20 is configured to cause the SR latch 22 to hold the comparison output signal Cout of the comparator 21. With this arrangement, a change from the signal cutoff state to the signal reception state of the optical signal Pin can be detected and indicated quickly. However, a change from the signal reception state to the signal cutoff state of the optical signal cannot be detected. In addition, no autonomous operation is possible because the reset signal RESET to reset the SR latch 22 is indispensable as an external control signal.

When the SR latch 22 is used, an indefinite logic may occur depending on the relationship between the logic level of the comparison output signal Cout of the comparator 21 and the logic level of the reset signal RESET. This problem can be solved by using a JK flip-flop circuit in place of the SR latch 22. However, this circuit separately needs a clock signal.

When the comparator 21 outputs at least one pulse of High level as the comparison output signal Cout, the SR latch 22 continuously outputs a High level signal as the signal cutoff detection signal LOS. This may lead to an operation error in case of large noise input at the time of signal cutoff of the optical signal Pin.

Hence, when this conventional technique is used in the optical receiver, it is impossible to appropriately drive the noise masking function of preventing unnecessary noise output in the absence of an optical signal.

The present invention has been made to solve the above-described problems, and has as its object to provide an optical signal detection technique that allows to perform an autonomous operation without any necessity of an external control signal and properly detect the presence/absence of input of an optical signal.

Means of Solution to the Problem

In order to achieve the above-described object, according to the present invention, there is provided an optical signal cutoff detection circuit that detects presence/absence of input of an optical signal based on an electrical signal obtained by photoelectrically converting an optical signal formed from a pulse train, comprising a comparator that outputs, out of the electrical signal input via a coupling capacitor, pulses having amplitudes not less than a reference value as a comparison output signal, and an analog holding circuit that charges a holding capacitor with each pulse contained in the comparison output signal and removes a DC voltage obtained by charging via a discharging resistor, thereby generating a holding output signal that changes in accordance with the presence/absence of input of the optical signal.

According to the present invention, there is also provided an optical receiver comprising a photoelectric conversion element that photoelectrically converts an optical signal formed from a pulse train into a photocurrent signal and outputs the photocurrent signal, a trans impedance amplifier that amplifies the photocurrent signal and outputs an electrical signal including an inverted signal and a noninverted signal, a limiting amplifier that amplifies each pulse of the pulse train contained in the electrical signal to a predetermined amplitude and outputs the pulse, and one of the above-described optical signal cutoff detection circuits that detect the presence/absence of input of the optical signal based on the electrical signal.

Effects of the Invention

According to the present invention, it is possible to perform an autonomous operation without any necessity of a control signal such as a reset signal outside the optical signal cutoff detection circuit and properly detect the presence/absence of input of an optical signal. Since it is unnecessary to input an external control signal, the circuit can easily be applied to even an optical receiver that does not have a function of outputting a control signal, and high versatility can be obtained. In addition, it is possible to remove a circuit portion for outputting a control signal from the optical receiver and thus reduce the cost. In addition, the analog holding circuit charges pulses contained in a burst signal, thereby detecting the presence/absence of the optical signal. For this reason, even in case of noise input at the time of signal cutoff of the optical signal, an operation error caused by this can be prevented, and a stable optical signal detection operation can be implemented.

BEST MODE FOR CARRYING OUT THE INVENTION

Figure 1:
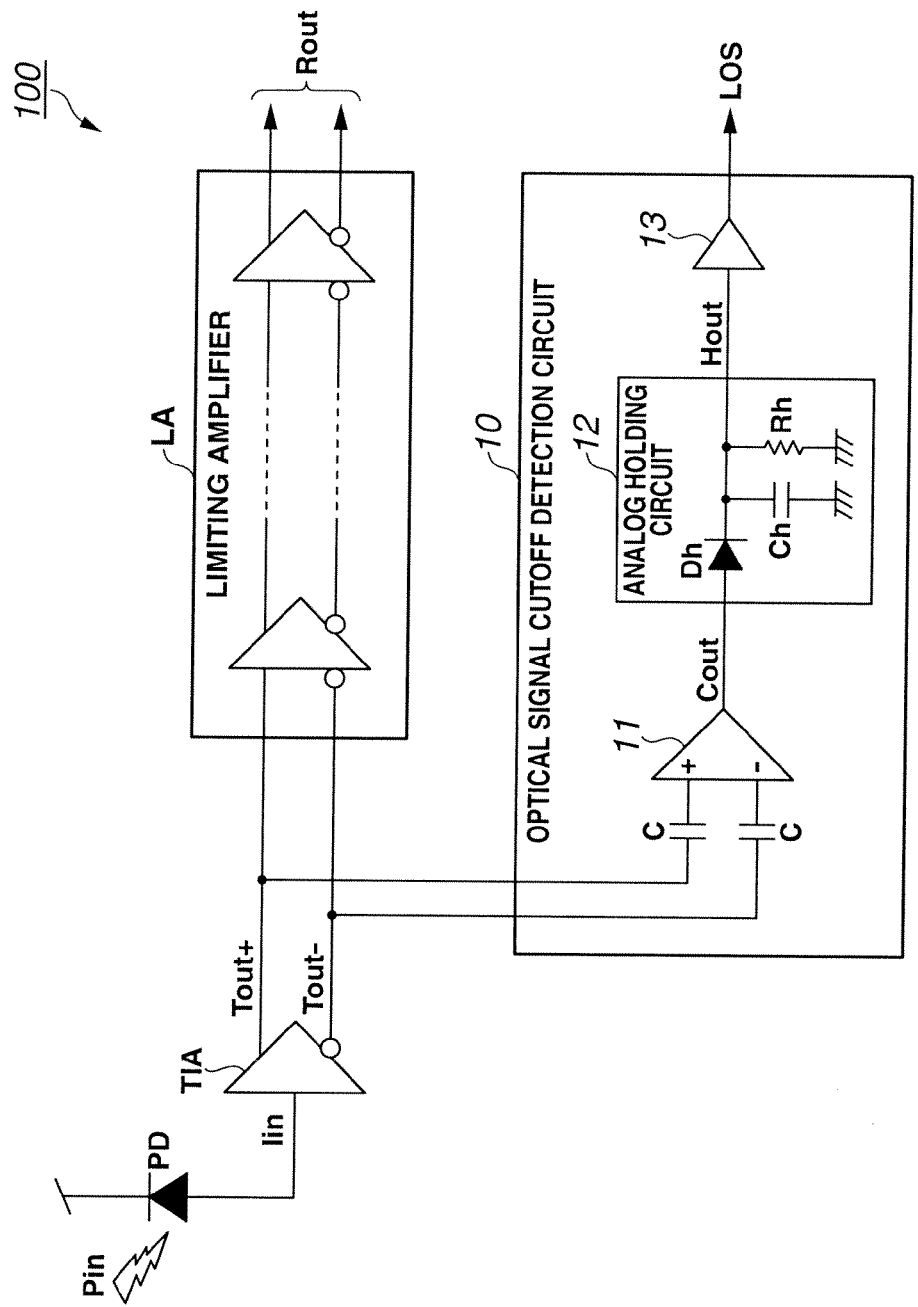
FIG. 1 is a block diagram showing the arrangement of an optical receiver and an optical signal cutoff detection circuit according to the first embodiment.

The embodiments of the present invention will now be described with reference to the accompanying drawings.

First Embodiment

An optical receiver and an optical signal cutoff detection circuit according to the first embodiment of the present invention will be described first with reference to FIG. 1.

An optical receiver 100 is a communication apparatus that converts an optical signal received via an optical fiber into an electrical signal and outputs it. The optical receiver 100 is used in an OLT that accommodates a plurality of users on the station side in a PON method employed by, for example, an FTTH system.

The optical receiver 100 includes, as main circuit components, a photodiode PD, a trans impedance amplifier TIA, a limiting amplifier LA, and an optical signal cutoff detection circuit 10.

An optical signal Pin that has arrived via an optical fiber is received by the photodiode PD, converted into a photocurrent signal Iin, and amplified by the trans impedance amplifier TIA serving as a preamplifier. An electrical signal Tout from the trans impedance amplifier TIA is input to the limiting amplifier LA serving as a post-amplifier, amplified so as to change the optical signal Pin having a different strength to an electrical signal having a predetermined amplitude, and output as a reception output Rout. Note that although not illustrated in FIG. 1, a waveform shaping circuit such as a CDR or a timing adjustment circuit is normally provided at the subsequent stage of the limiting amplifier LA so as to extract a clock signal from the data signal and perform waveform shaping to obtain a digital signal easy to handle.

The optical signal cutoff detection circuit 10 is a circuit portion that is connected to the trans impedance amplifier TIA in parallel to the limiting amplifier LA so as to detect the presence/absence of input of the optical signal Pin based on the electrical signal from the trans impedance amplifier TIA.

The optical signal cutoff detection circuit 10 according to this embodiment includes a comparator 11 that outputs, out of the electrical signal Tout input from the trans impedance amplifier TIA via coupling capacitors, pulses having amplitudes equal to or larger than a reference value as a comparison output signal Cout, and an analog holding circuit 12 that charges a holding capacitor with each pulse contained in the comparison output signal Cout and also removes a DC voltage obtained by the charging via a discharging resistor, thereby generating a holding output signal Hout that changes in accordance with the presence/absence of input of the optical signal Pin.

The arrangement of the optical signal cutoff detection circuit according to the first embodiment will be described next in detail with reference to FIG. 1.

The optical signal cutoff detection circuit 10 includes, as main circuit portions, the comparator 11, the analog holding circuit 12, and an output buffer 13.

The comparator 11 has a function of outputting, out of a noninverted signal Tout+ and an inverted signal Tout− input from the trans impedance amplifier TIA via coupling capacitors C for AC coupling, pulses having amplitudes equal to or larger than a preset reference value as the comparison output signal Cout. Note that details of the internal arrangement of the comparator 11 will be described later with reference to FIG. 2.

As described above, the optical signal Pin is converted into the photocurrent signal Iin by the photodiode PD and amplified by the trans impedance amplifier TIA. The obtained electrical signal Tout is input to the limiting amplifier LA.

The limiting amplifier LA is normally formed from multistage amplification circuits. To adjust the level, an amplification circuit of a preceding stage and an amplification circuit of a subsequent stage are often connected via an emitter-follower circuit. Hence, the input stage is an amplification circuit or an emitter-follower circuit. The output terminal of the trans impedance amplifier TIA and the input terminal of the limiting amplifier LA are connected by AC coupling or DC coupling.

On the other hand, the noninverted signal Tout+ and inverted signal Tout− from the trans impedance amplifier TIA are also connected to the comparator 11 by AC coupling via the coupling capacitors C.

The capacitance of the coupling capacitor C is optimized in accordance with the bit rate of the reception signal. For example, when the bit rate is 10 Gbps, the capacitance is preferably about 1 pF or less.

The analog holding circuit 12 has a function of charging a holding capacitor Ch with each pulse contained in the comparison output signal Cout output from the comparator 11 and also removing an analog DC voltage obtained by the charging via a discharging resistor Rh, thereby generating, from the DC voltage, the holding output signal Hout that changes in accordance with the presence/absence of input of the optical signal Pin.

The output buffer 13 has a function of shaping the holding output signal Hout formed from the analog DC voltage generated by the analog holding circuit 12 into a digital logic signal used in a general logic gate, thereby outputting a signal cutoff detection signal LOS representing the presence/absence of input of the optical signal Pin.

The comparison output signal Cout output from the comparator 11 is input to the analog holding circuit 12 and used for charging/discharging. The obtained holding output signal Rout formed from the analog DC voltage is output as the signal cutoff detection signal LOS formed from the digital logic signal via the output buffer 13.

The holding output signal Hout of the analog holding circuit 12 holds the peak upon receiving the optical signal Pin and changes to Low level at the time of signal cutoff in principle. Hence, the signal cutoff detection signal LOS also has a corresponding logic. At this time, for example, to make the signal cutoff detection signal LOS indicate signal cutoff by High level, the logic is constructed to change the signal cutoff detection signal LOS to High level when the holding output signal Hout is at Low level.

In this embodiment, as shown in FIG. 1, the analog holding circuit 12 includes a diode Dh that rectifies each pulse contained in the comparison output signal Cout output from the comparator 11, the holding capacitor Ch to be charged with the pulses rectified by the diode Dh, and the discharging resistor Rh that removes the DC voltage obtained by the charging.

More specifically, the diode Dh has the anode terminal connected to the output terminal of the comparator 11, and the cathode terminal connected to one port of the holding capacitor Ch. The other port of the holding capacitor Ch is connected to the ground potential.

Out of the pulses contained in the comparison output signal Cout output from the comparator 11, only pulses of level higher than that of the DC voltage of the holding capacitor Ch by the diode junction voltage are thus extracted by the diode Dh to charge the holding capacitor Ch.

The discharging resistor Rh is connected in parallel to the holding capacitor Ch so as to naturally remove, via the discharging resistor Rh, the DC voltage that has charged the holding capacitor Ch. When the optical signal Pin is in the signal cutoff state, the DC voltage is removed. Hence, the signal cutoff detection signal LOS representing the signal cutoff of the optical signal Pin is autonomously output. A time constant is decided by the holding capacitor Ch and the discharging resistor Rh while maintaining the consistency between the response speed to detect the start of a burst signal input as the electrical signal Tout+ or Tout− and the tolerance to consecutive identical digits to prevent the circuit from erroneously determining a consecutive identical digit section contained in the burst signal as signal cutoff.

Comparator

The internal arrangement of the comparator 11 used in the optical signal cutoff detection circuit 10 according to this embodiment will be described next in detail with reference to FIG. 2.

The comparator 11 is provided with a bias circuit 11A, a first-stage amplification circuit (front-side amplification circuit) 11B, a first-stage emitter-follower circuit 11C, a second-stage amplification circuit (rear-side amplification circuit) 11D, and a second-stage emitter-follower circuit 11E. These circuit portions are integrated on a semiconductor chip. An example in which the circuit portions are formed by bipolar transistors will be described here. Some or all of them may be formed by MOSFETs.

The bias circuit 11A is formed from a resistance dividing circuit including resistive elements R1 and R3 pulled up to a power supply potential Vcc and resistive elements R2 and R4 pulled down to a ground potential GND. The bias circuit 11A has a function of applying DC biases according to the resistance ratio of the resistive elements R1 and R3 and that of the resistive elements R2 and R4 to the electrical signals Tout+ and Tout− input from the trans impedance amplifier TIA via the coupling capacitors C, respectively. Actually, since the resistance ratios are equal, equal DC biases are applied to the input electrical signals Tout+ and Tout−.

The first-stage amplification circuit 11B is formed from a differential amplification circuit including transistors Q1 and Q2 that form a differential pair, a resistive element R5 connected between the power supply potential Vcc and the collector terminal of the transistor Q1, a resistive element R6 connected between the power supply potential Vcc and the collector terminal of the transistor Q2, resistive elements R7 and R8 connected in series between the emitter terminals of the transistors Q1 and Q2, and a constant current source I1 connected between the ground potential GND and the node of the resistive elements R7 and R8. The first-stage amplification circuit 11B has a function of differentially amplifying the electrical signals Tout+ and Tout− input to the base terminals of the transistors Q1 and Q2.

The resistive elements R5 and R6 correspond to the load resistors of the differential amplification circuit, for which different resistance values according to the reference value are set in advance. For this reason, a DC voltage difference corresponding to the offset voltage is applied to the differential outputs from the collector terminals of the transistors Q1 and Q2.

The first-stage emitter-follower circuit 11C includes transistors Q3 and Q4 having the collector terminals connected to the power supply potential Vcc, and constant current sources I2 and I3 connected between the ground potential GND and the emitter terminals of the transistors Q3 and Q4. The first-stage emitter-follower circuit 11C has a function of outputting the signals output from the first-stage amplification circuit 11B and input to the base terminals of the transistors Q3 and Q4 as low-impedance signals.

The second-stage amplification circuit 11D is formed from a differential amplification circuit including transistors Q5 and Q6 that form a differential pair, a resistive element R9 connected between the power supply potential Vcc and the collector terminal of the transistor Q5, a resistive element R10 connected between the power supply potential Vcc and the collector terminal of the transistor Q6, and a constant current source I4 connected between the ground potential GND and the node of the emitter terminals of the transistors Q5 and Q6. The second-stage amplification circuit 11D has a function of differentially amplifying first-stage output signal Tout input from the first-stage emitter-follower circuit 11C to the base terminals of the transistors Q5 and Q6.

In this case, the first-stage amplification circuit 11B applies the offset voltage to the inverted output and noninverted output of the first-stage output signal Fout to be input to the base terminals of the transistors Q5 and Q6. For this reason, when the amplitudes of pulses contained in the inverted output and noninverted output are smaller than that of the offset voltage, these signals do not cross. As a result, the second-stage differential outputs output from the collector terminals of the transistors Q5 and Q6 do not change. Hence, out of the pulses contained in the electrical signals Tout+ and Tout− input to the comparator 11, pulses having amplitudes smaller than the reference value corresponding to the offset voltage decided by the resistive elements R5 and R6 are removed, and only pulses having amplitudes equal to or larger than the reference value are output.

The second-stage emitter-follower circuit 11E includes transistors Q7 and Q8 having the collector terminals connected to the power supply potential Vcc, and constant current sources I5 and I6 connected between the ground potential GND and the emitter terminals of the transistors Q7 and Q8. The second-stage emitter-follower circuit 11E has a function of outputting the differential outputs output from the second-stage amplification circuit 11D and input to the base terminals of the transistors Q7 and Q8 as the low-impedance comparison output signal Cout.

Operation of First Embodiment

The operation of the optical signal cutoff detection circuit 10 according to this embodiment will be described next with reference to FIG. 3.

The system to which the optical receiver 100 including the optical signal cutoff detection circuit 10 is applied is assumed to be 10G-EPON. The input burst signal has a bit rate of 10 Gbps and an amplitude of about 10 mV (amplitude of about 20 mV as differential signals). The amplitude of 10 mV corresponds to the output amplitude for the minimum reception sensitivity (about −30 dBm) of a general TIA. In addition, the burst signal includes a consecutive identical digit section of, for example, 128 bits, that is, about 13 nsec, and the response time to detect the start of the burst signal is 100 ns or less. The capacitance value of the holding capacitor Ch of the analog holding circuit 12 is 1 pF, and the resistance value of the discharging resistor Rh is 25 kΩ. Note that the power supply potential Vcc is 3.3 V, and the ground potential GND is 0 V.

Figure 2:
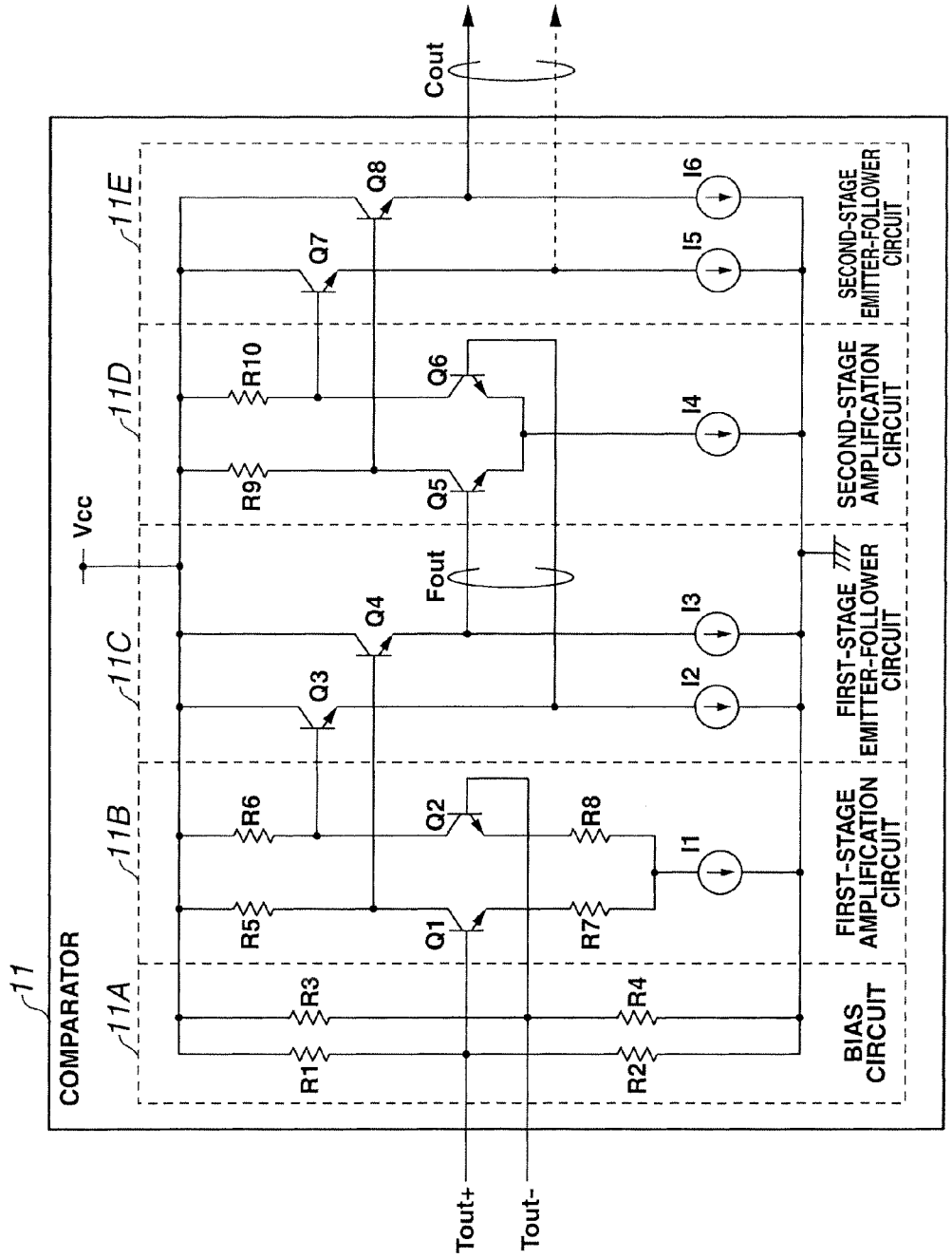
FIG. 2 is a circuit diagram showing an example of the arrangement of a comparator according to the first embodiment.

The burst signals input from the trans impedance amplifier TIA are input to the comparator 11 via the coupling capacitors C as differential waveforms, and differentially amplified by the first-stage amplification circuit 11B shown in FIG. 2. At this time, since different resistance values according to the reference value are set in advance as the resistance values of the resistive elements R5 and R6, an offset voltage corresponding to the reference value is applied between the DC bias of the inverted signal Pout− out of the first-stage output signal Pout and the DC bias of the noninverted signal Fout+.

The first-stage output signal Fout is input to the second-stage amplification circuit 11D via the first-stage emitter-follower circuit 11C and differentially amplified. For this reason, for pulses having amplitudes smaller than that of the offset voltage out of the pulses contained in the inverted signal Fout− and the noninverted signal Fout+, the signals do not cross and are not output from the second-stage amplification circuit 11D. Hence, the second-stage amplification circuit 11D removes the pulses having amplitudes smaller than that of the offset voltage and outputs only pulses having amplitudes equal to or larger than the reference value via the second-stage emitter-follower circuit 11E as the comparison output signal Cout.

Subsequently, the comparison output signal Cout is input to the analog holding circuit 12. Out of the pulses contained in the comparison output signal Cout, pulses only in a signal section where the pulses have a level higher than that of the DC voltage of the holding capacitor Ch by the diode junction voltage are extracted by the diode Dh to charge the holding capacitor Ch.

The DC voltage of the holding capacitor Ch, that is, the voltage value of the holding output signal Hout thus increases because of charging by pulses having amplitudes equal to or larger than the reference value out of the burst signal of the optical signal Pin. In a signal cutoff section without the burst signal, a consecutive identical digit section without pulse signals out of the burst signal, and a section of pulses having amplitudes smaller than the reference value, the voltage value decreases because of discharging via the discharging resistor Rh. Note that the voltage of the holding output signal bout does not lower up to the ground potential GND in the signal cutoff section without the burst signal because the DC bias is applied to the comparison output signal Cout.

At this time, the time constant of the holding capacitor Ch and the discharging resistor Rh is decided while maintaining the consistency between the response speed to detect the start of the burst signal and the tolerance to consecutive identical digits to prevent the circuit from erroneously determining a consecutive identical digit section contained in the burst signal as signal cutoff.

With this arrangement, when the burst signal is input, the holding output signal Hout is charged from Low level without the burst signal to High level representing the presence of the burst signal by the pulses contained in the burst signal in a duration of 100 ns less defined as the response time. When a consecutive identical digit section contained in the burst signal has been reached, the holding output signal Hout is held at High level representing the presence of the burst signal, that is, to be equal to or more than a threshold Hth for about 13 nsec corresponding to the maximum consecutive identical digit section even if the holding output signal Hout is discharged by the pulse cutoff.

Hence, when the burst signal is input, the signal cutoff detection signal LOS representing detection of the optical signal Pin can be output in a predetermined response time. Even when the burst signal contains a consecutive identical digit section, the circuit can hold and output the signal cutoff detection signal LOS representing detection of the optical signal Pin without erroneously outputting the signal cutoff detection signal LOS representing signal cutoff. In particular, the signal cutoff detection signal LOS is output in a response time of about 10 ns in FIG. 3.

When a signal cutoff state is set at the end of the burst signal, the signal cutoff detection signal LOS representing signal cutoff of the optical signal Pin can be output after the elapse of the maximum consecutive identical digit section from the end time.

Effects of First Embodiment

As described above, in this embodiment, the comparator 11 of the optical signal cutoff detection circuit 10 outputs, out of the electrical signal input from the trans impedance amplifier TIA via the coupling capacitors, pulses having amplitudes equal to or larger than the reference value as the comparison output signal Cout. The analog holding circuit 12 charges the holding capacitor with each pulse contained in the comparison output signal Cout and also removes the DC voltage obtained by the charging via the discharging resistor, thereby generating the holding output signal Hoot that changes in accordance with the presence/absence of input of the optical signal. This allows to perform an autonomous operation without any necessity of an external control signal such as a reset signal and properly detect the presence/absence of input of an optical signal.

Since it is unnecessary to input a control signal such as a reset signal from outside of the optical signal cutoff detection circuit 10, the circuit can easily be applied to even an optical receiver that does not have a function of outputting a control signal, and high versatility can be obtained. In addition, it is possible to remove a circuit portion for outputting a control signal from the optical receiver and thus reduce the cost.

In the above-described related art, the signal cutoff detection signal is generated by latching the comparison output signal from the comparator. Hence, in case of noise input at the time of signal cutoff of the optical signal Pin, a detection error occurs due to the noise input, and a signal cutoff detection signal representing the presence of the optical signal is output. In this embodiment, the analog holding circuit 12 charges pulses contained in the burst signal, thereby detecting the presence/absence of the optical signal. For this reason, even in case of noise input at the time of signal cutoff of the optical signal Pin, an operation error caused by this can be prevented, and a stable optical signal detection operation can be implemented.

In this embodiment, the analog holding circuit 12 includes the diode Dh that rectifies each pulse contained in the comparison output signal Cout, the holding capacitor Ch to be charged with the rectified pulses, and the discharging resistor Rh that removes the DC voltage obtained by the charging. It is therefore possible to generate the holding output signal that changes in accordance with the presence/absence of input of the optical signal in a very small circuit scale. At this time, the time constant of the holding capacitor Ch and the discharging resistor Rh can be decided in accordance with the target FTTH system while maintaining the consistency between the response speed to detect the start of the burst signal and the tolerance to consecutive identical digits to prevent the circuit from erroneously determining a consecutive identical digit section contained in the burst signal as signal cutoff. It is therefore possible to obtain sufficient noise immunity while ensuring a high response speed.

In this embodiment, the comparator 11 is provided with the two differential amplification circuits 11B and 11D connected in series. Out of these differential amplification circuits, the first-stage amplification circuit 11B located on the front side differentially amplifies the inverted signal Pout− and the noninverted signal Fout+ using the two load resistors R5 and R6 corresponding to the inverted signal and the noninverted signal, respectively, and having different resistance values according to the reference value, thereby outputting the inverted signal and the noninverted signal while applying an offset voltage corresponding to the reference value between the DC bias of the inverted signal and the DC bias of the noninverted signal. The rear-side differential amplification circuit located on the rear side of the preceding-stage differential amplification circuit differentially amplifies the inverted signal Pout− and the noninverted signal Fout+ output from the front-side differential amplification circuit. It is therefore possible to remove pulses having amplitudes smaller than the reference value even in case of noise input at the time of signal cutoff of the optical signal Pin.

Second Embodiment

An optical signal cutoff detection circuit 10 according to the second embodiment of the present invention will be described next with reference to FIG. 4.

In the first embodiment, a case has been explained in which the analog holding circuit 12 charges the holding capacitor Ch with the comparison output signal Cout from the comparator 11 via the diode Dh and removes the DC voltage obtained by the charging via the discharging resistor Rh connected in parallel to the holding capacitor Ch. In the second embodiment, an example will be described in which a diode-connected transistor Qh is used in place of the diode Dh, and a discharging resistor Rh is connected in parallel to the transistor Qh.

Figure 4:
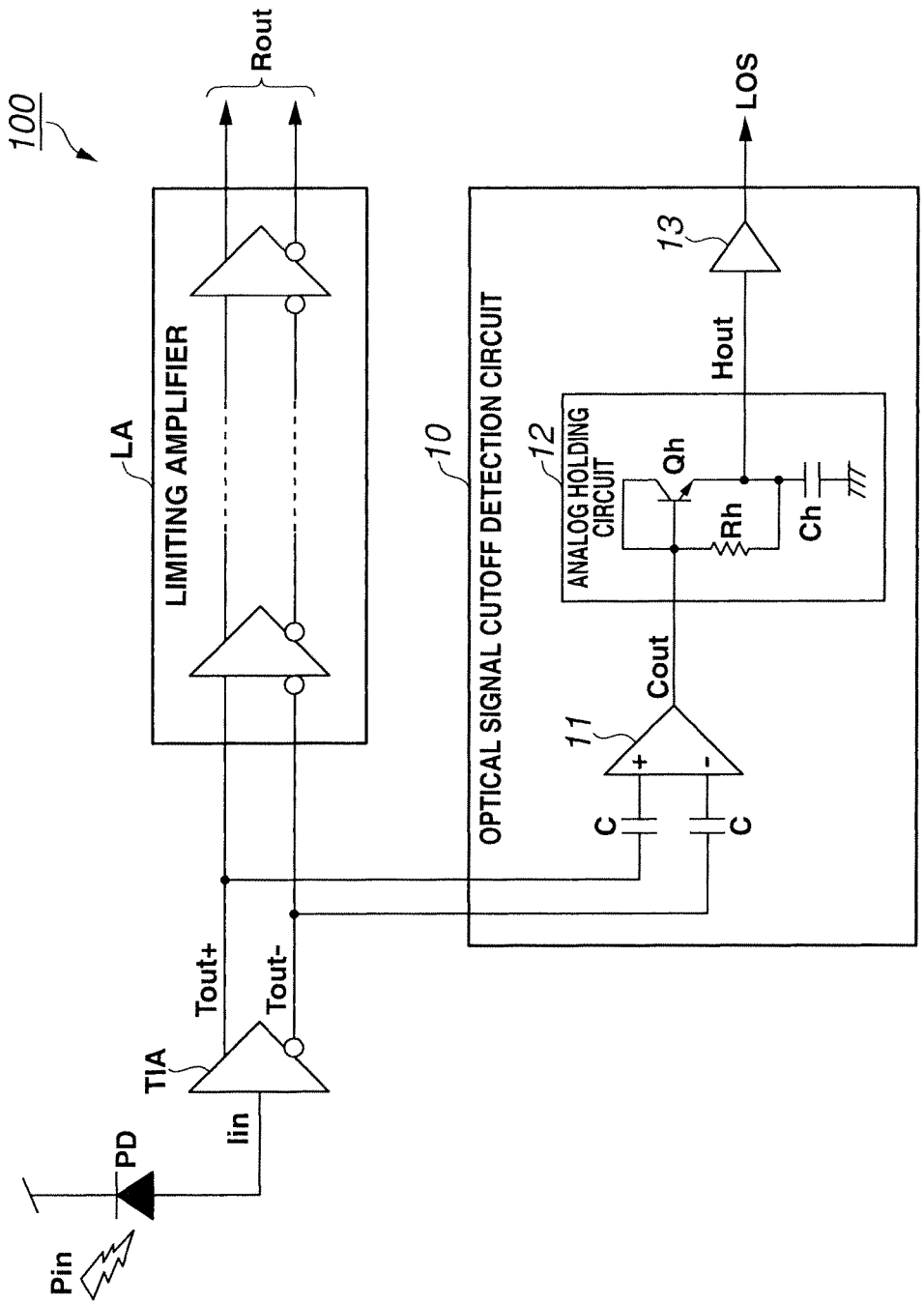
FIG. 4 is a block diagram showing the arrangement of an optical receiver and an optical signal cutoff detection circuit according to the second embodiment.

In an analog holding circuit 12 according to this embodiment, as shown in FIG. 4, the transistor Qh has the base terminal connected to the collector terminal and a comparison output signal Cout of a comparator 11, and the emitter terminal connected to one port of a holding capacitor Ch. The other port of the holding capacitor Ch is connected to the ground potential. The discharging resistor Rh is connected in parallel between the base terminal and the emitter terminal of the transistor Qh.

Out of the pulses contained in the comparison output signal Cout output from the comparator 11, only pulses of level higher than that of the DC voltage of the holding capacitor Ch by the diode junction voltage are thus extracted by the transistor Qh to charge the holding capacitor Ch. In addition, out of the pulses, only pulses of level higher than that of the DC voltage of the holding capacitor Ch charge the holding capacitor Ch via the discharging resistor Rh. A voltage drop corresponding to the diode junction voltage is thus eliminated, and the DC voltage of the holding capacitor Ch holds the peak at a power supply potential Vcc.

In the signal cutoff state of an optical signal Pin, the DC voltage is removed to the side of the comparator 11 via the discharging resistor Rh. Hence, a signal cutoff detection signal LOS representing the signal cutoff of the optical signal Pin is autonomously output, as in the first embodiment.

Effects of Second Embodiment

As described above, in this embodiment, the analog holding circuit 12 includes the diode-connected transistor that rectifies each pulse contained in the comparison output signal, the holding capacitor to be charged with the rectified pulses, and the discharging resistor that removes the DC voltage obtained by the charging. It is therefore possible to output High level of a digital logic signal as a holding output signal Hout. An output buffer 13 can easily perform level conversion from the holding output signal Hout to the signal cutoff detection signal LOS formed from a digital logic signal. In addition, using the diode-connected transistor as a diode allows to omit the process of separately forming a diode.

In this embodiment, the diode-connected transistor Qh is used. However, a diode Dh that is the same as in the first embodiment may be used in place of the transistor Qh.

A time constant is decided by the holding capacitor Ch and the discharging resistor Rh while maintaining the consistency between the response speed to detect the start of a burst signal input as electrical signal Tout+ or Tout− and the tolerance to consecutive identical digits to prevent the circuit from erroneously determining a consecutive identical digit section contained in the burst signal as signal cutoff.

Third Embodiment

Figure 5:
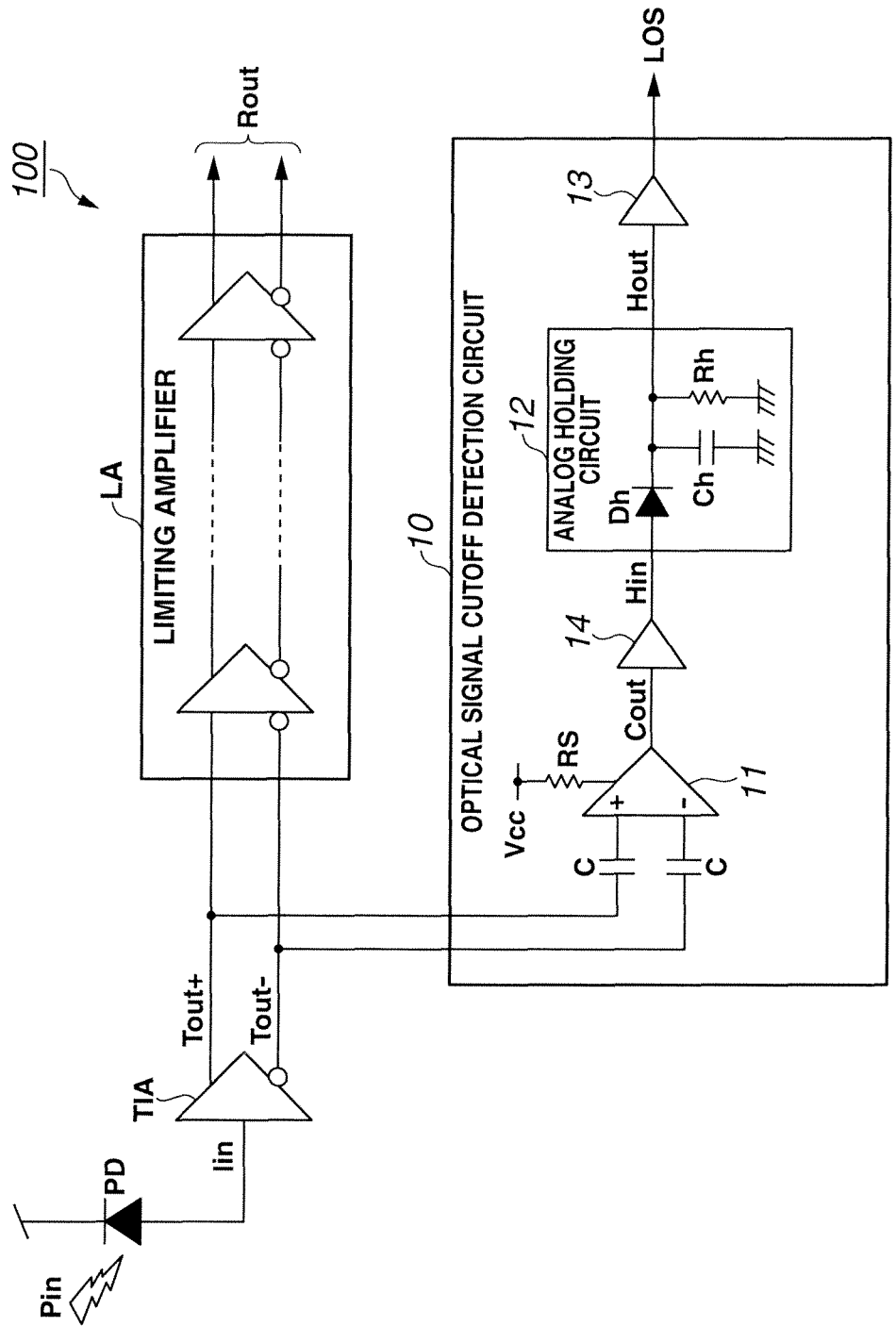
FIG. 5 is a block diagram showing the arrangement of an optical receiver and an optical signal cutoff detection circuit according to the third embodiment.

An optical signal cutoff detection circuit 10 according to the third embodiment of the present invention will be described next with reference to FIG. 5.

In this embodiment, an example will be described in which a comparator 11 is provided with a variable resistor Rs to adjust the optical signal detection sensitivity.

In this embodiment, the comparator 11 includes a plurality of differential amplification circuits connected in series. Out of the differential amplification circuits, the differential amplification circuit located at the backend includes the variable resistor Rs formed from at least one of two load resistors corresponding to the inverted signal and the noninverted signal, respectively. The circuit also includes an intermediate buffer 14 that generates a comparison output signal Cout from differential signals output from the comparator 11 and outputs it to an analog holding circuit 12.

Figure 6:
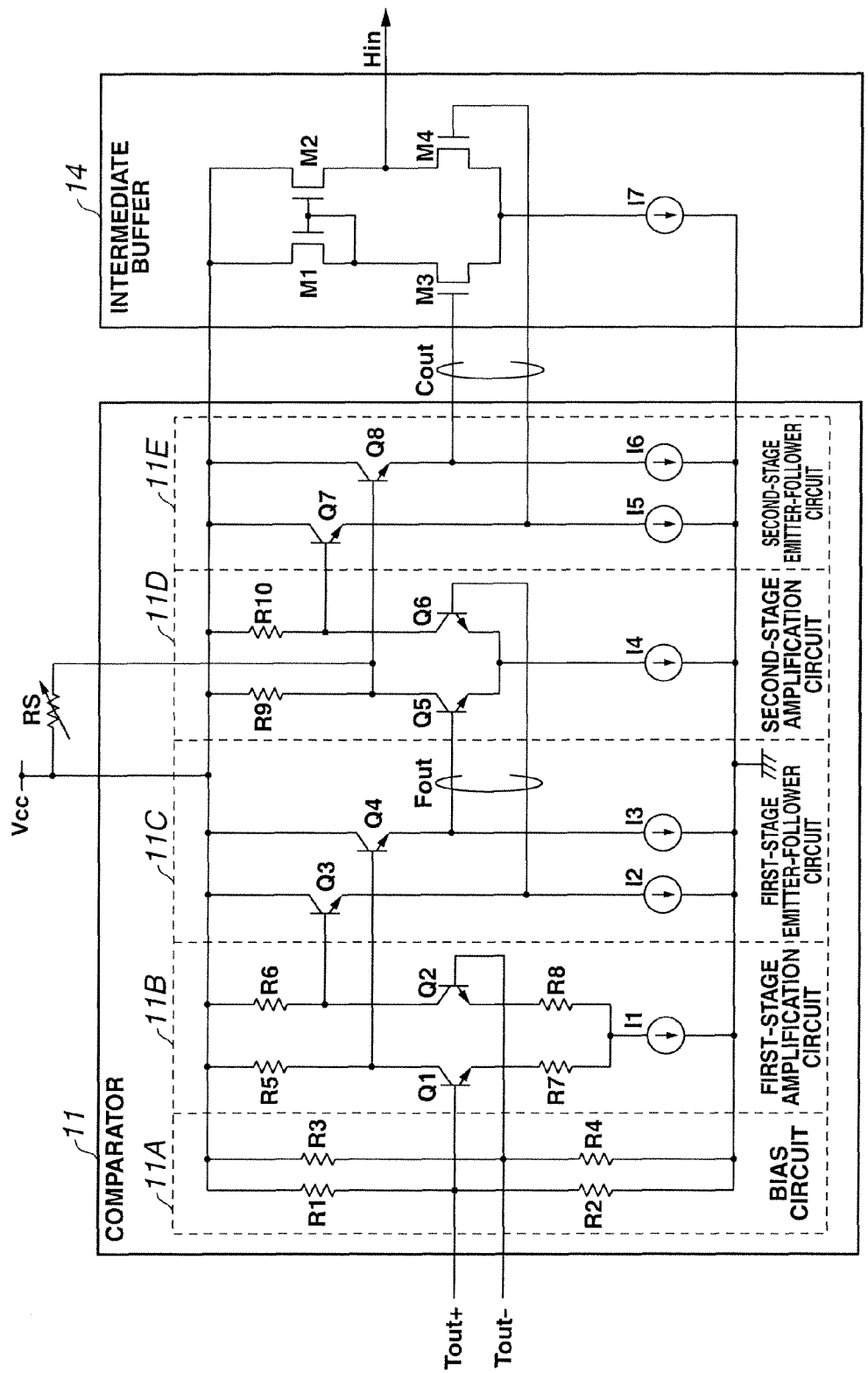
FIG. 6 is a circuit diagram showing the arrangement of a comparator according to the third embodiment.

As compared to the comparator according to the first embodiment described above with reference to FIG. 2, as shown in FIG. 6, the variable resistor Rs for sensitivity adjustment is connected in parallel to a load resistor R9 corresponding to a signal Fout+ out of the resistive elements R9 and R10 serving as the load resistors of a second-stage amplification circuit 11D (backend amplification circuit) in the converter 10 according to this embodiment. That is, the variable resistor Rs has one port connected to the collector terminal of a transistor Q5, and the other port connected to a power supply potential Vcc.

On the other hand, the intermediate buffer 14 includes FETs M1 and M2 that form a differential pair, and FETs M3 and M4 that form a differential pair. The FETs M1 and M2 constitute a current mirror circuit. The FET M1 has the gate terminal connected to the source terminal and the gate terminal of the FET M2. The drain terminal of the FET M1 and that of the FET M2 are connected to the power supply potential Vcc. The FETs M3 and M4 constitute a differential amplification circuit. The FET M3 has the drain terminal connected to the source terminal of the FET M1. The FET M4 has the drain terminal connected to the source terminal of the FET M2. A constant current source 17 is connected between a ground potential GND and the node of the FETs M3 and M4. The intermediate buffer 14 thus differentially amplifies the comparison output signal Cout input to the gate terminals of the FETs M3 and M4, and outputs a noninverted output that is output from the FET M4 out of the obtained differential comparison outputs to the analog holding circuit 12 as a holding input signal Hin.

Figure 7:
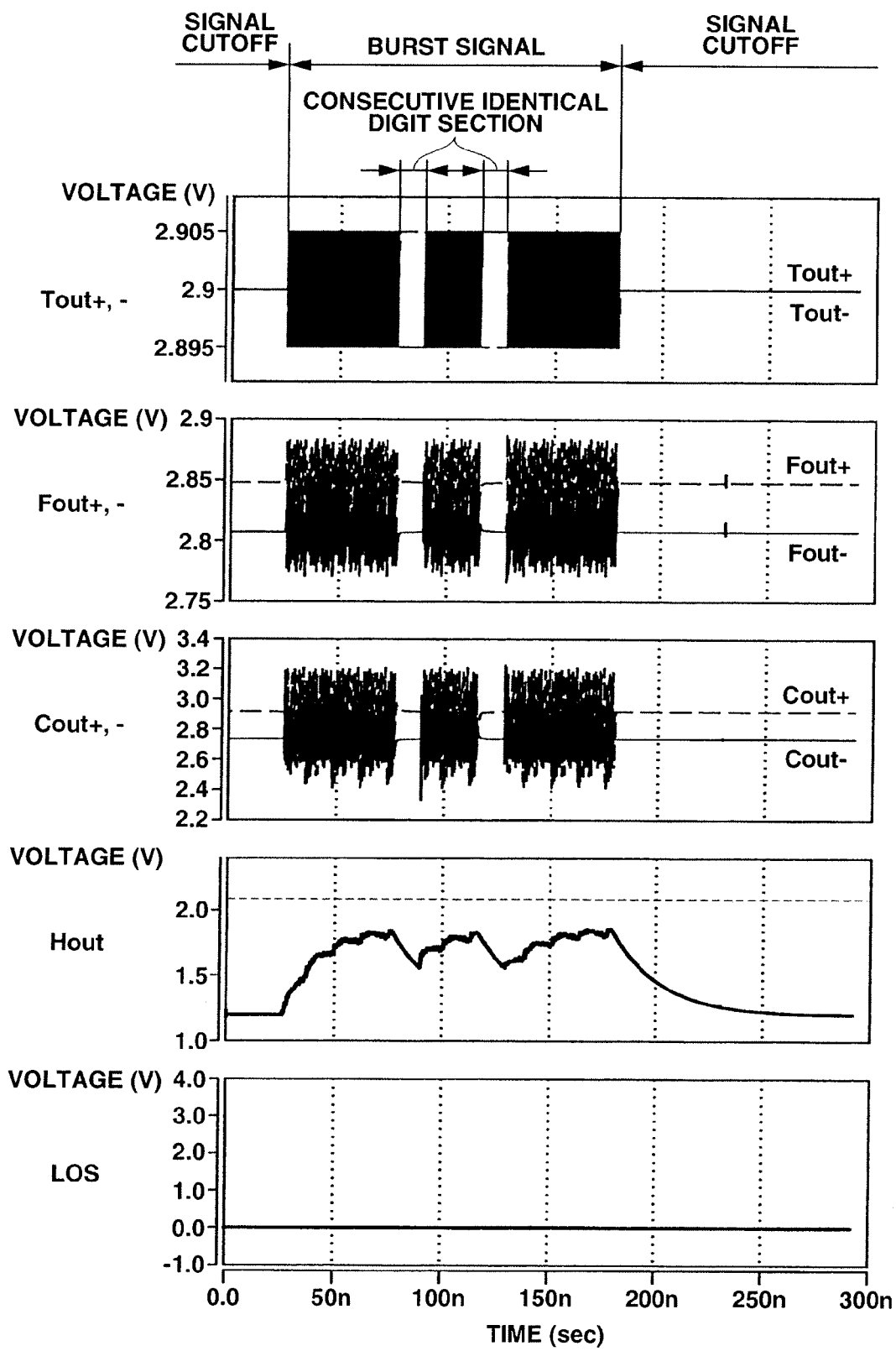
FIG. 7 is a timing chart showing the operation of the optical signal cutoff detection circuit according to the third embodiment.

As shown in FIG. 7, when the resistance value of the variable resistor Rs is changed, the load resistance value of the transistor Q5 changes. For this reason, out of the comparison output signal Cout from the second-stage amplification circuit 11D, the DC bias of an inverted signal Cout− changes, and the offset voltage with respect to the DC bias of a noninverted signal Cout+ changes.

Hence, in the intermediate buffer 14, for pulses having amplitudes smaller than that of the offset voltage out of the pulses contained in the inverted signal Cout− and the noninverted signal Cout+, the signals do not cross and are not output from the intermediate buffer 14 as the holding input signal Hin. Hence, the magnitude of the DC voltage that charges a holding capacitor Ch of the analog holding circuit 12 changes.

Figure 3:
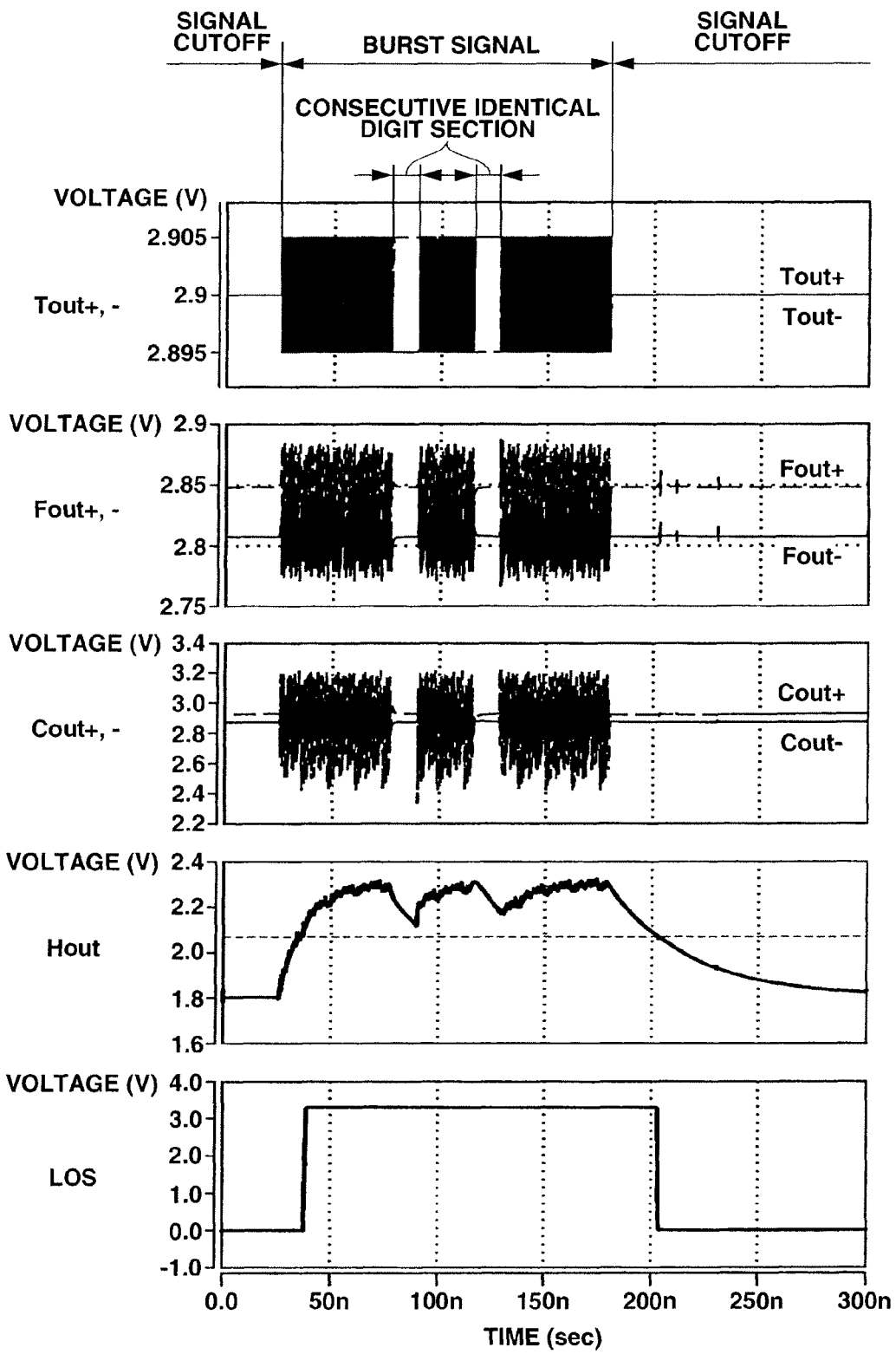
FIG. 3 is a timing chart showing the operation of the optical signal cutoff detection circuit according to the first embodiment.

For example, the inverted signal Cout– of the comparison output signal Cout shown in FIG. 7 is obtained by adjusting the resistance value of the variable resistor Rs, for which the DC bias is set to be lower than that in FIG. 3 by about 0.2 V. As compared to FIG. 3, the ratio the pulses of the inverted signal Cout– and the noninverted signal Cout+ cross lowers, and the number and amplitudes of pulses output as the holding input signal Hin decrease. Hence, the voltage of the holding output signal Hout of the analog holding circuit 12 lowers in general as compared to FIG. 3 and is lower than a threshold Hth. As a result, the burst signal detection sensitivity lowers, and a signal cutoff detection signal LOS of High level representing the presence of the burst signal is not output.

Effects of Third Embodiment

As described above, in this embodiment, the comparator 11 includes a plurality of amplification circuits 11B and 11D connected in series. Out of the differential amplification circuits, the differential amplification circuit 11D located at the backend includes the variable resistor formed from one load resistor R9 of the two load resistors R9 and R10 corresponding to an inverted signal Fout– and a noninverted signal Fout+, respectively. The intermediate buffer 14 differentially amplifies the comparison output signal Cout output from the comparator 11 and outputs it to the analog holding circuit 12. Adjusting the value of the variable resistor allows to adjust the detection sensitivity to detect the presence/absence of input of an optical signal Pin. Hence, even when the temperature or the power supply potential varies, a stable optical signal detection operation can be implemented by changing the resistance value of the variable resistor in accordance with the variation in the temperature or the power supply potential.

In this embodiment, an example has been described in which out of the differential amplification circuits of the comparator 11, the differential amplification circuit 11D at the backend is provided with the variable resistor Rs. However, the present invention is not limited to this. For example, the variable resistor Rs may be provided to at least one of load resistors R5 and R6 in the first-stage amplification circuit 11B. In this case, since the second-stage amplification circuit 11D differentially amplifies a first-stage output signal Fout of the first-stage amplification circuit 11B, the intermediate buffer 14 can be omitted.

In the comparator 11, the first-stage amplification circuit 11B applies the offset voltage to the inverted signal Fout– and noninverted signal Fout+ of the first-stage output signal Fout. Hence, the amplification factor of the first-stage amplification circuit 11B is set to be low, and that of the second-stage amplification circuit 11D is set to be high. Since the load resistors of the second-stage amplification circuit 11D also have large resistance values, the values of the load resistors can be changed largely. Connecting the variable resistor Rs to the second-stage amplification circuit 11D enables to widen the sensitivity adjustment range.

In this embodiment, a case in which the variable resistor Rs is connected in parallel to the load resistor has been described. However, the present invention is not limited to this, and any other load resistor circuit capable of changing the resistance value is usable.

Fourth Embodiment

Figure 8:
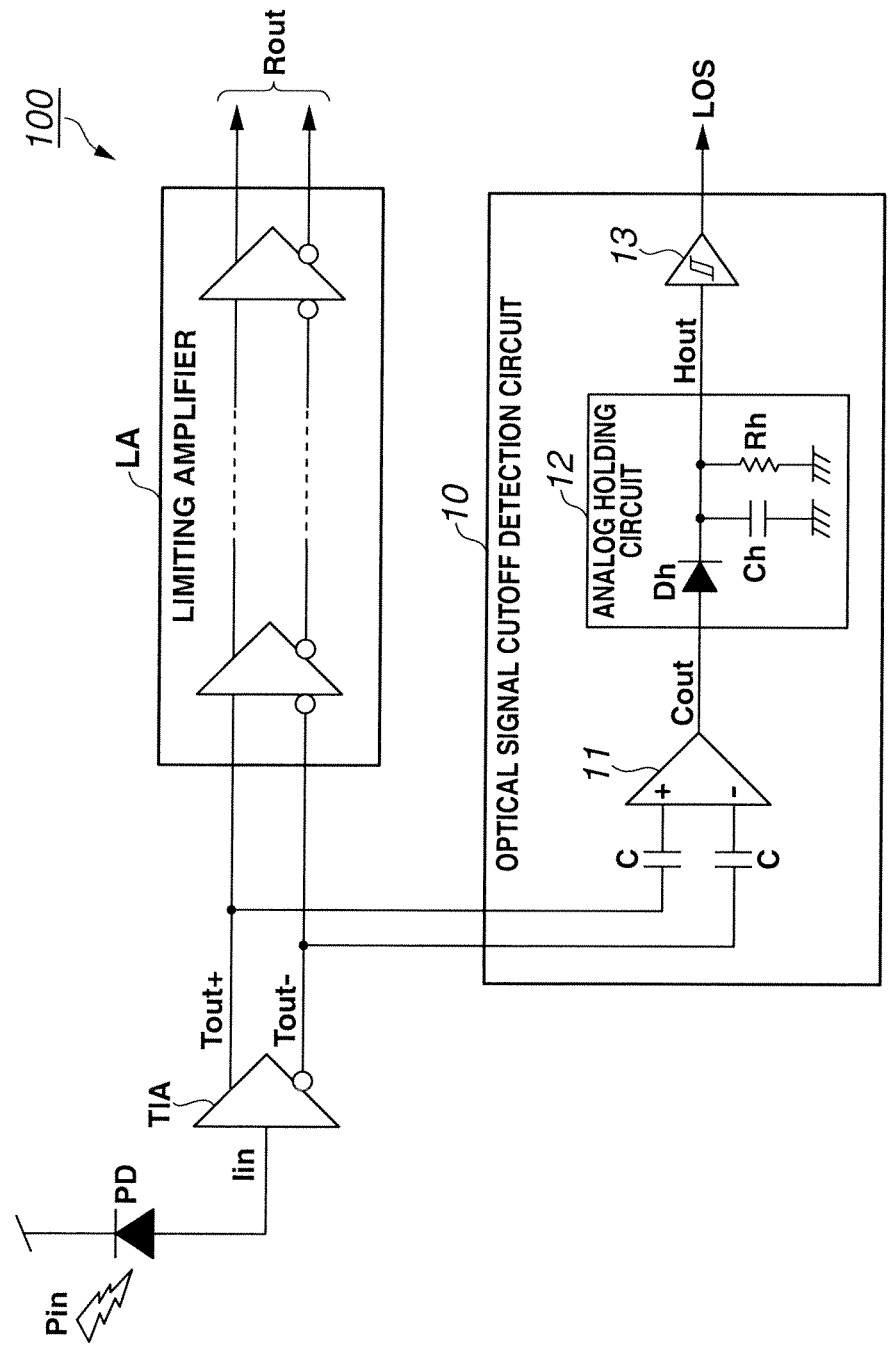
FIG. 8 is a block diagram showing the arrangement of an optical receiver and an optical signal cutoff detection circuit according to the fourth embodiment.

An optical signal cutoff detection circuit 10 according to the fourth embodiment of the present invention will be described next with reference to FIG. 8.

In the fourth embodiment, an example will be described in which a buffer having a hysteresis characteristic is used as an output buffer 13.

The rise and fall of a holding output signal Hout of an analog holding circuit 12 are moderate. The voltage level also varies in a consecutive identical digit section contained in a burst signal. Such a characteristic results from the CR time constant of the analog holding circuit 12. Hence, for example, if the capacitance of a holding capacitor Ch or the value of a discharging resistor Rh is increased to suppress the level variation in the consecutive identical digit section, the rise and fall become slower.

Such an increase in the rise time or fall time and the variation in the held level in the consecutive identical digit section are not preferable because they cause chattering of a signal cutoff detection signal LOS output from the output buffer 13.

In this embodiment, a logic circuit having a hysteresis characteristic, such as a Schmitt trigger inverter, is used as the analog holding circuit 12. Another inverter or output buffer may be connected to the Schmitt trigger inverter output for level adjustment or buffering of the signal cutoff detection signal LOS, as a matter of course. A hysteresis comparator may be connected in place of the Schmitt trigger inverter.

Effects of Fourth Embodiment

As described above, in this embodiment, a logic circuit having a hysteresis characteristic, such as a Schmitt trigger inverter, is used as the analog holding circuit 12. For this reason, even when the CR time constant of the analog holding circuit 12 is set to be large, chattering of the signal cutoff detection signal LOS can be suppressed.

Fifth Embodiment

Figure 9:
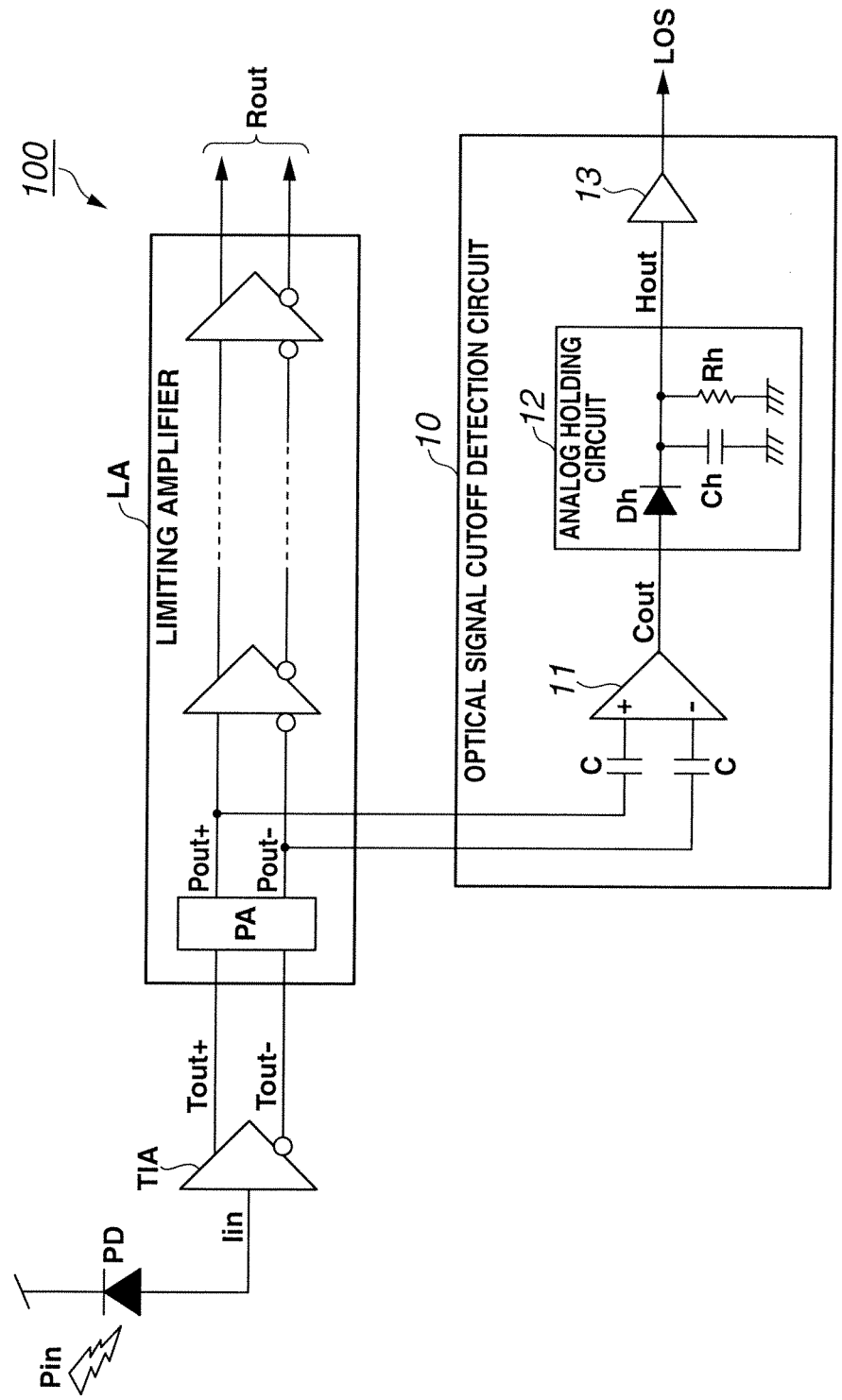
FIG. 9 is a block diagram showing the arrangement of an optical receiver and an optical signal cutoff detection circuit according to the fifth embodiment.
Figure 10:
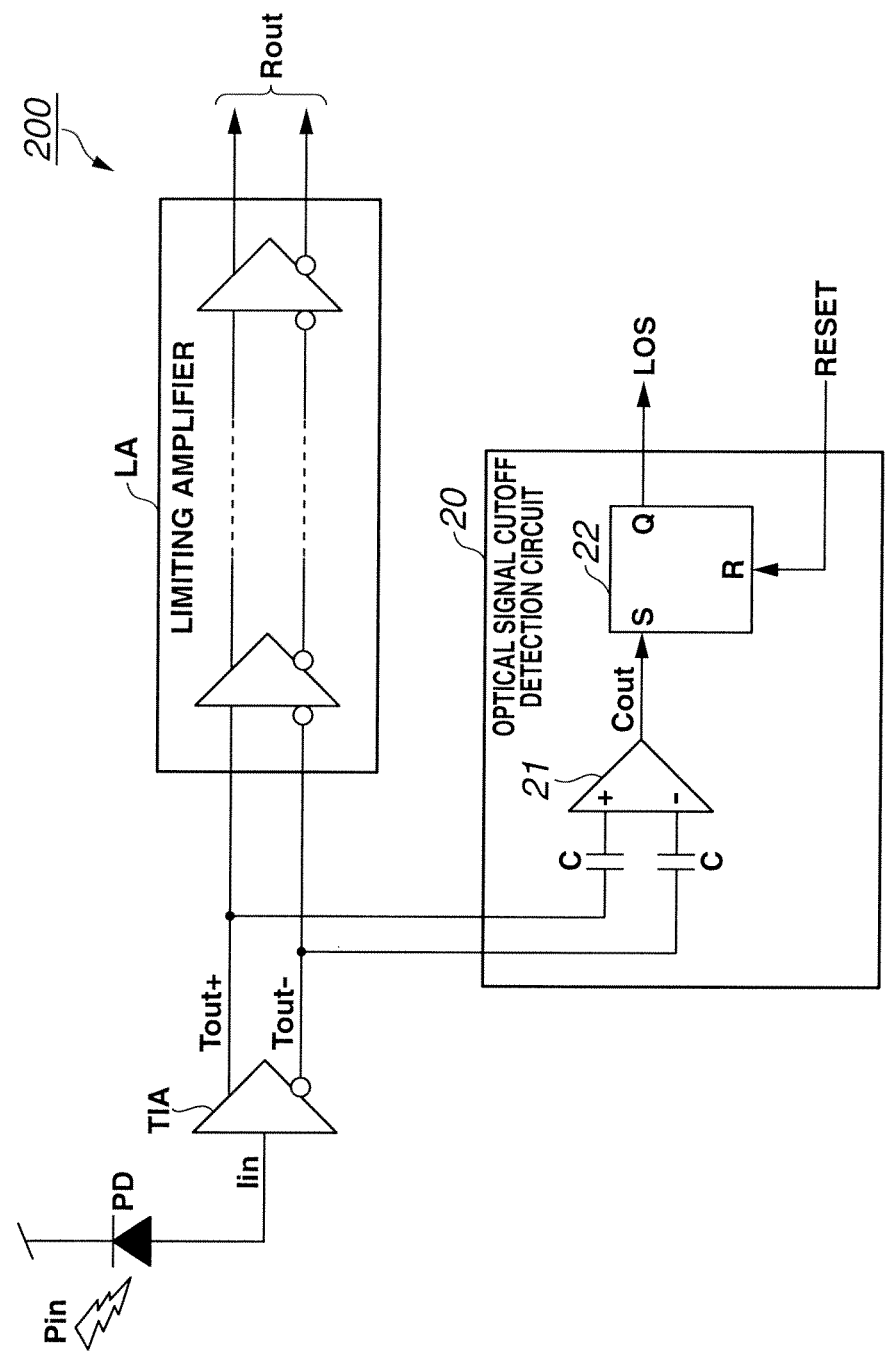
FIG. 10 is a block diagram showing the arrangement of a conventional optical receiver and optical signal cutoff detection circuit.
Figure 11:
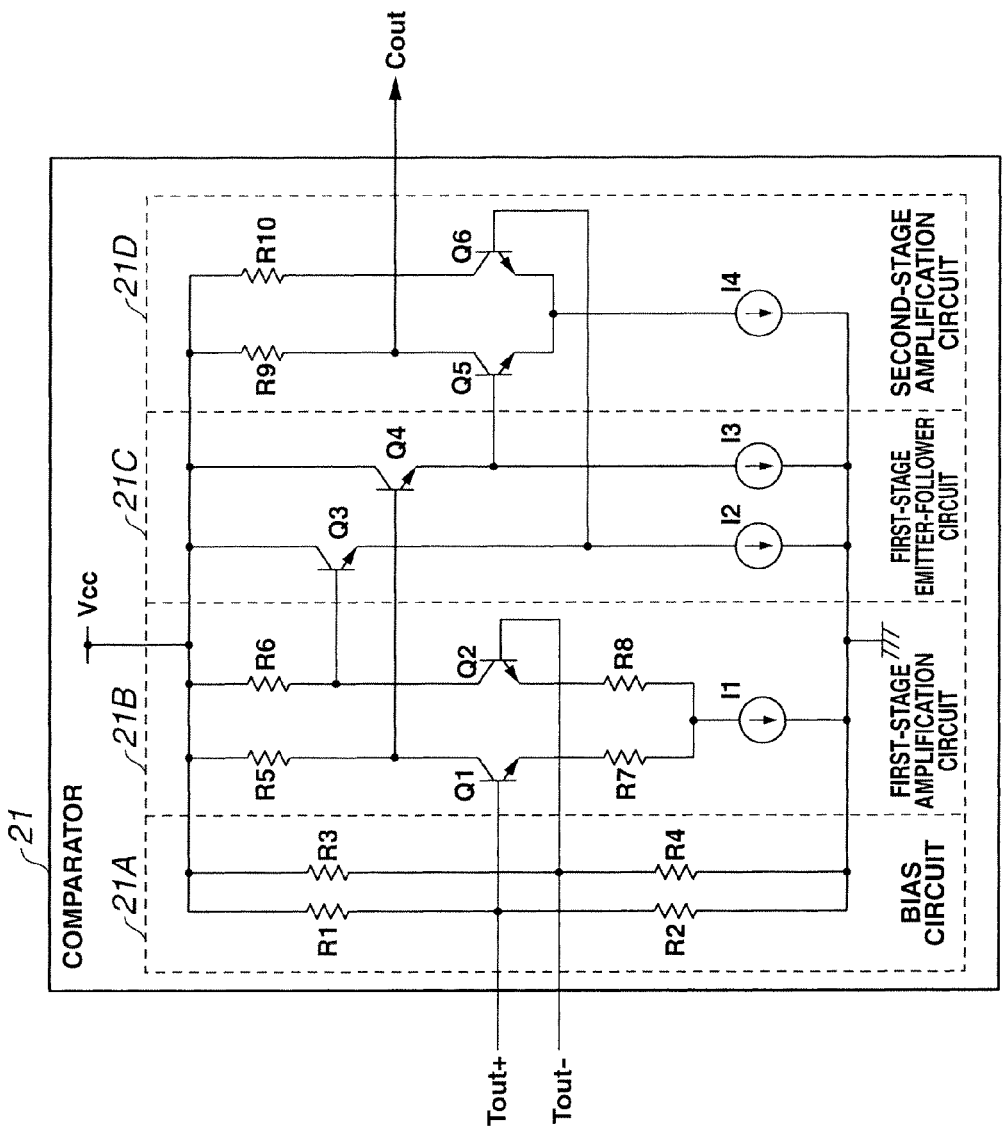
FIG. 11 is a circuit diagram showing the arrangement of a comparator used in the conventional optical signal cutoff detection circuit.

An optical receiver and an optical signal cutoff detection circuit according to the fifth embodiment of the present invention will be described next with reference to FIG. 9.

In the first embodiment, an example has been described in which the electrical signal Tout from the trans impedance amplifier TIA is input to the comparator 11 of the optical signal cutoff detection circuit 10. In the fifth embodiment, an electrical signal Pout (Pout+ an Pout–) output from a first-stage amplification circuit PA included in a limiting amplifier LA is input to a comparator 11.

The first-stage amplification circuit PA of the limiting amplifier LA is formed from an emitter follower circuit or differential amplification circuit having a low output impedance. The first-stage amplification circuit PA has a function of outputting an input electrical signal Tout from a trans impedance amplifier TIA to an amplification circuit of the subsequent stage provided in the limiting amplifier LA.

Hence, the electrical signal Tout from the trans impedance amplifier TIA is input to the limiting amplifier LA without being branched to an optical signal cutoff detection circuit 10. The low-impedance electrical signal Pout output from the first-stage amplification circuit PA of the limiting amplifier LA is branched to the optical signal cutoff detection circuit 10.

Effects of Fifth Embodiment

As described above, in this embodiment, not the electrical signal Tout from the trans impedance amplifier TIA but the low-impedance electrical signal Pout output from the first-stage amplification circuit PA provided in the limiting amplifier LA is branched and input to the optical signal cutoff detection circuit 10. This allows the first-stage amplification circuit PA to cover the decrease in the load impedance of the trans impedance amplifier TIA caused upon branching the electrical signal Tout. It is therefore possible to reduce the driving load of the trans impedance amplifier TIA. In addition, impedance conversion by the first-stage amplification circuit PA facilitates to obtain impedance matching between the output of the trans impedance amplifier TIA and the input of the limiting amplifier LA.

Extension of Embodiments

The present invention has been described above with reference to the embodiments. However, the present invention is not limited to the above embodiments. Various changes and modifications understandable by those who are skilled in the art can be done for the arrangements and details of the present invention without departing the scope of the present invention.

EXPLANATION OF THE REFERENCE NUMERALS AND SIGNS

100 . . . optical receiver, 10 . . . optical signal cutoff detection circuit, 11 . . . comparator, 12 . . . analog holding circuit, C . . . coupling capacitor, Pin . . . optical signal, Tout . . . electrical signal, Hout . . . holding output signal

The invention claimed is:

1. An optical signal cutoff detection circuit comprising:
a comparator that inputs, via a coupling capacitor, an electrical signal obtained by photoelectrically converting an optical signal formed from a pulse train, and outputs pulses having amplitudes not less than a reference value as a comparison output signal; and
an analog holding circuit that charges a holding capacitor with each pulse contained in the comparison output signal and removes a DC voltage obtained by charging via a discharging resistor, thereby generating a holding output signal that changes in accordance with presence/absence of input of the optical signal, wherein
the electrical signal is formed from differential signals including an inverted signal and a noninverted signal, and
the comparator includes a plurality of differential amplification circuits connected in series, and out of the differential amplification circuits, a first differential amplification circuit includes a variable resistor formed from at least one of two load resistors corresponding to the inverted signal and the noninverted signal, respectively.

2. An optical signal cutoff detection circuit according to claim 1, wherein the first differential amplification circuit is located at a backend of the differential amplification circuits, the optical signal cutoff detection circuit further comprising an intermediate buffer that generates the comparison output signal from the differential signals output from the comparator and outputs the comparison output signal to the analog holding circuit.

3. An optical signal cutoff detection circuit according to claim 2, wherein the analog holding circuit includes a diode that rectifies each pulse contained in the comparison output signal, the holding capacitor to be charged with the rectified pulses, and the discharging resistor that removes the DC voltage obtained by the charging.

4. An optical signal cutoff detection circuit according to claim 2, further comprising a buffer that shapes and outputs, based on a hysteresis characteristic, the holding output signal obtained by the analog holding circuit.

5. An optical signal cutoff detection circuit according to claim 2, wherein
out of the differential amplification circuits, a front-side differential amplification circuit located on a front side differentially amplifies the inverted signal and the noninverted signal using two load resistors corresponding to the inverted signal and the noninverted signal, respectively, and having different resistance values according to the reference value, thereby outputting the inverted signal and the noninverted signal while applying an offset voltage corresponding to the reference value between a DC bias of the inverted signal and a DC bias of the noninverted signal, and a rear-side differential amplification circuit located on a rear side of the front-side differential amplification circuit differentially amplifies the inverted signal and the noninverted signal output from the front-side differential amplification circuit.

6. An optical signal cutoff detection circuit according to claim 1, wherein the analog holding circuit includes a diode that rectifies each pulse contained in the comparison output signal, the holding capacitor to be charged with the rectified pulses, and the discharging resistor that removes the DC voltage obtained by the charging.

7. An optical signal cutoff detection circuit according to claim 1, further comprising a buffer that shapes and outputs, based on a hysteresis characteristic, the holding output signal obtained by the analog holding circuit.

8. An optical signal cutoff detection circuit according to claim 1, wherein
out of the differential amplification circuits, a front-side differential amplification circuit located on a front side differentially amplifies the inverted signal and the noninverted signal using two load resistors corresponding to the inverted signal and the noninverted signal, respectively, and having different resistance values according to the reference value, thereby outputting the inverted signal and the noninverted signal while applying an offset voltage corresponding to the reference value between a DC bias of the inverted signal and a DC bias of the noninverted signal, and a rear-side differential amplification circuit located on a rear side of the front-side differential amplification circuit differentially amplifies the inverted signal and the noninverted signal output from the front-side differential amplification circuit.

9. An optical receiver comprising:
a photoelectric conversion element that photoelectrically converts an optical signal formed from a pulse train into a photocurrent signal and outputs the photocurrent signal;
a trans impedance amplifier that amplifies the photocurrent signal and outputs an electrical signal including an inverted signal and a noninverted signal;
a limiting amplifier that amplifies each pulse of the pulse train contained in the electrical signal to a predetermined amplitude and outputs the pulse;
a comparator that inputs, via a coupling capacitor, the electrical signal obtained by photoelectrically converting the optical signal formed from the pulse train, and outputs pulses having amplitudes not less than a reference value as a comparison output signal; and
an analog holding circuit that charges a holding capacitor with each pulse contained in the comparison output signal and removes a DC voltage obtained by charging via a discharging resistor, thereby generating a holding output signal that changes in accordance with presence/absence of input of the optical signal, wherein the comparator includes a plurality of differential amplification circuits connected in series, and out of the differential amplification circuits, a differential amplification circuit located on a front side of a backend includes a variable resistor formed from at least one of two load resistors corresponding to the inverted signal and the noninverted signal, respectively.

10. An optical receiver comprising:

a photoelectric conversion element that photoelectrically converts an optical signal formed from a pulse train into a photocurrent signal and outputs the photocurrent signal;

a trans impedance amplifier that amplifies the photocurrent signal and outputs an electrical signal including an inverted signal and a noninverted signal;

a limiting amplifier that amplifies each pulse of the pulse train contained in the electrical signal to a predetermined amplitude and outputs the pulse;

a comparator that inputs, via a coupling capacitor, the electrical signal obtained by photoelectrically converting the optical signal formed from the pulse train, and outputs pulses having amplitudes not less than a reference value as a comparison output signal;

an analog holding circuit that charges a holding capacitor with each pulse contained in the comparison output signal and removes a DC voltage obtained by charging via a discharging resistor, thereby generating a holding output signal that changes in accordance with presence/absence of input of the optical signal; and an intermediate buffer that generates the comparison output signal from the differential signals output from the comparator and outputs the comparison output signal to the analog holding circuit, wherein the comparator includes a plurality of differential amplification circuits connected in series, and out of the differential amplification circuits, a differential amplification circuit located at a backend includes a variable resistor formed from at least one of two load resistors corresponding to the inverted signal and the noninverted signal, respectively.

* * * * *